United States Patent [19]

Nowell

[11] Patent Number: 5,784,841
[45] Date of Patent: Jul. 28, 1998

[54] ELECTRICAL RACEWAY HOUSED IN A STRUCTURAL MEMBER

[75] Inventor: Jeffrey A. Nowell, Hudson, Ohio

[73] Assignee: Patio Enclosures, Inc., Macedonia, Ohio

[21] Appl. No.: 583,947

[22] Filed: Jan. 11, 1996

[51] Int. Cl.$^6$ ............................................. H02G 3/00
[52] U.S. Cl. ............... 52/220.5; 52/220.7; 52/732.3; 52/731.5; 52/731.9; 174/49; 174/101; 439/215; 439/216; 403/381
[58] Field of Search ................. 52/220.7, 220.5, 52/287.1, 732.2, 732.3, 731.5, 731.9; 174/48, 49, 101, 95, 68.3, 70 C, 72 C; 439/113, 114, 209, 215, 216; 403/381

[56] References Cited

U.S. PATENT DOCUMENTS

| | | | |
|---|---|---|---|
| 1,979,804 | 11/1934 | Lutz | 174/68.3 X |
| 3,037,590 | 6/1962 | Pavecka | 52/732.2 X |
| 3,066,770 | 12/1962 | Millard et al. | 52/220.7 |
| 3,374,590 | 3/1968 | Kessler . | |
| 3,377,756 | 4/1968 | Polhamus . | |
| 3,609,210 | 9/1971 | Guritz . | |
| 3,815,311 | 6/1974 | Nisula et al. | 52/732.2 X |
| 3,844,078 | 10/1974 | Jensen et al. . | |
| 3,866,377 | 2/1975 | De Schutter | 52/220.7 X |
| 4,015,397 | 4/1977 | Flachbarth et al. | 174/48 X |
| 4,189,881 | 2/1980 | Hawley . | |
| 4,216,823 | 8/1980 | Keldmann | 174/48 X |
| 4,218,579 | 8/1980 | Joly | 174/48 |
| 4,354,052 | 10/1982 | Albany et al. . | |
| 4,497,260 | 2/1985 | Bucher | 52/732.2 X |
| 4,902,852 | 2/1990 | Wuertz | 174/48 |
| 5,007,222 | 4/1991 | Raymond | 52/731.5 X |
| 5,024,614 | 6/1991 | Dola et al. | 439/114 |
| 5,062,246 | 11/1991 | Sykes | 52/220.7 X |
| 5,089,667 | 2/1992 | Goussin et al. | 174/101 |
| 5,134,250 | 7/1992 | Caveney et al. . | |
| 5,325,649 | 7/1994 | Kajiwara | 403/381 X |
| 5,336,849 | 8/1994 | Whitney . | |
| 5,479,747 | 1/1996 | Wu | 52/220.7 |

FOREIGN PATENT DOCUMENTS

| | | | |
|---|---|---|---|
| 248696 | 12/1987 | European Pat. Off. | 174/48 |
| 426889 | 5/1991 | European Pat. Off. | 174/68.3 |
| 511085 | 10/1992 | European Pat. Off. | 174/48 |
| 2381145 | 10/1978 | France | 52/732.3 |
| 2683403 | 5/1993 | France | 174/68.3 |
| 2704990 | 11/1994 | France | 174/48 |
| 3335884 | 4/1985 | Germany | 174/101 |
| 269757 | 7/1950 | Switzerland | 403/381 |

*Primary Examiner*—Wynn E. Wood
*Assistant Examiner*—Laura A. Callo
*Attorney, Agent, or Firm*—Fay, Sharpe, Beall, Fagan, Minnich & McKee

[57] ABSTRACT

A structural member for a building includes a one-piece elongated support member having a pair of legs defining a trough therebetween and a projection extending into the trough from each of the legs. A one-piece elongated electrical raceway can be secured in the support member. The raceway includes a tubular housing having a pair of opposed side walls and open a pair of opposed end walls to define a channel extending between opposed ends of the housing such that an associated electrical conductor can extend through the housing. A first wing projects away from a first side wall of the tubular housing, and a second wing projects away from a second side wall of the tubular housing. The first and second wings flex to snap into a cooperating relationship with the projections of the support member to selectively secure the tubular housing in the support member trough.

24 Claims, 5 Drawing Sheets

ELECTRICAL RACEWAY HOUSED IN A STRUCTURAL MEMBER

BACKGROUND OF THE INVENTION

This invention relates to structural members. More particularly, the current invention relates to a hollow structural member which is capable of supporting an electrical raceway within it.

When a sunroom is added to a house, electricians are called out before and during the construction process to hardwire the room through the flooring structure—whether it be a wood deck or a concrete slab—if possible. When this construction technique is not possible, a "knee-wall" is constructed of wood frame, brick or block and the electrical wire is threaded through this short wall. However, this construction technique reduces the floor surface area of the room and is considered unsightly by some. Alternatively, surface-mounted commercially available raceways can be employed. These raceways are unsightly as they are exposed on the inside of the room. In addition, some communities' building departments and review boards do not approve of this construction.

Also known is a prefabricated wall unit for patio enclosures including modular wall panels wherein a channel-like housing is formed on the inner side of the wall unit to receive electrical conductors. The channel is formed in part by a frame portion of the panel having a cross-web and at least one secondary web extending at an angle thereto to define walls of the housing. The secondary web or webs fix the spacing between two cross-webs to provide a fixed width aperture adapted to removably receive a closure strip which retains and conceals the electrical conductors.

This system, however, requires the use of a panel board operating both as a knee-wall and as a mounting surface for the electrical outlets. But, the channel used for running wiring through the system is not protected from the aluminum framing of the modular wall panel. Obviously, since aluminum—and other metals used as framing—are conductors, it would be beneficial to shield the metal frame members as much as possible from any wiring which runs through them.

Accordingly, it has been considered desirable to develop a new and improved structural member for holding an electrical raceway which would overcome the foregoing difficulties and others while providing better and more advantageous overall results.

BRIEF SUMMARY OF THE INVENTION

In accordance with the present invention, a new and improved electrical raceway is provided.

More particularly, in accordance with this aspect of the invention, the raceway comprises a tubular housing having a longitudinally extending channel through which an associated electrical conductor can extend. A first wing projects away from a first wall of the tubular housing, and a second wing projects away from a second wall of the tubular housing. The first and second wings cooperate with sections of an associated structural member to secure the tubular housing in the structural member.

Preferably, the first wing comprises a first section projecting approximately perpendicular to the first wall, a second section extending approximately perpendicular to the first section, and a third section extending at an acute angle to the second section. If desired, the first wing can further comprise a shoulder to find at the free end of the third section. Alternatively, the first wing can further comprise a fourth section extending approximately perpendicular to the third section and a fifth section extending at an acute angle to the fourth section.

The tubular housing can comprise an approximately rectangular body such that the first and second walls thereof are opposed side walls and further including a top wall connected at its respective ends to an adjacent portion of the first and second side walls and a bottom wall connected at its respective ends to an adjacent portion of the first and second side walls. If desired, a barrier wall can extend into the channel from at least one of the top and bottom walls parallel to the first and second walls and located therebetween. The barrier wall divides the channel into first and second sections.

In accordance with another aspect of the present invention, a structural member for a building is provided.

More particularly, in accordance with this aspect of the invention, the structural member comprises a one-piece elongated support member having a pair of legs defining a trough therebetween and a projection extending into the trough from each of the legs. An electrical raceway can be secured in the trough member. The raceway comprises a tubular housing having a longitudinally extending channel through which an associated electrical conductor can extend and first and second wings. The first wing projects away from the first side of the tubular housing, and the second wing projects away from a second side of the tubular housing. The first and second wings cooperate with the projections of the support member to secure the tubular housing in the support member.

Preferably, the first wing comprises a first section projecting approximately perpendicular to a wall defining a first side, a second section extending approximately perpendicular to the first section, and the third section extending at an acute angle to the second section. The first wing can further comprise a shoulder defined at a free end of the third section. Alternatively, the first wing can further comprise a fourth section extending approximately perpendicular to the third section and a fifth section extending at an acute angle to the fourth section.

The tubular housing can comprise a first side wall, a second side wall spaced from the first side wall, a top wall connected at its respective ends to an adjacent portion of the first and second side walls, and a bottom wall connected at its respective ends to an adjacent portion of the first and second side walls. If desired, a barrier wall can extend into the channel from at least one of the top and bottom walls parallel to the first and second side walls and located therebetween. The barrier wall divides the channel into a first section and a second section.

If desired, the projection extending from each leg into the channel can comprise a finger. Alternatively, the projection extending from each leg into the channel can comprise an L-shaped arm. The legs can each further comprise a protrusion spaced from such L-shaped arm with each protrusion cooperating with a portion of a respective wing. In such an embodiment, the protrusion can be located on a finger extending away from the leg in spaced relation to the L-shaped arm. The structural member can further comprise a cover for closing the trough defined in the support member to fully shield the raceway. If desired, a means can be provided for selectively mounting the cover on the support member.

One advantage of the present invention is the provision of new and improved structural member.

Another advantage of the present invention is the provision of a structural member which is hollow or trough-shaped and can hold an electrical raceway therein.

Still another advantage of the present invention is the provision of an electrical raceway which is so designed that it can be secured in a variety of different structural members.

An additional advantage of the present invention is the provision of an electrical raceway in the form of a tubular housing having a pair of opposed wings. The wings can cooperate with opposed projections of a support member to selectively secure the raceway in a trough of the support member.

A further advantage of the present invention is the provision of an electrical raceway having two spaced channels. One of the channels can be used for electrical wires while the other channel can be used for speaker wires, telephone wires and the like.

A yet further advantage of the present invention is the provision of a structural member in which electrical wiring can be totally concealed when the structural member is fully constructed. When a panel of the structural member is removed, however, access may be had to the wiring for repair or replacement of same.

Still other benefits and advantages of the invention will become apparent those of average skill in the art upon reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
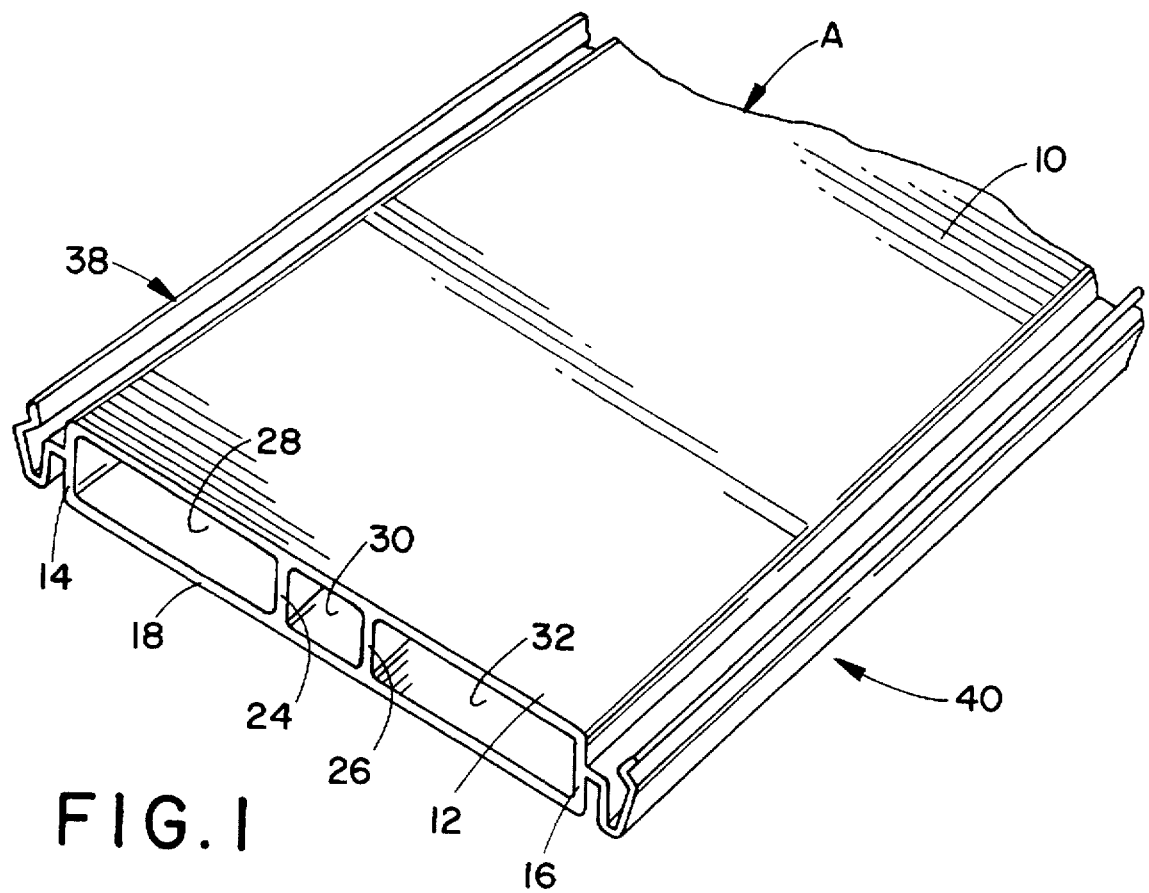
FIG. 1 is a perspective view of an electrical raceway according to the present invention.
Figure 8:
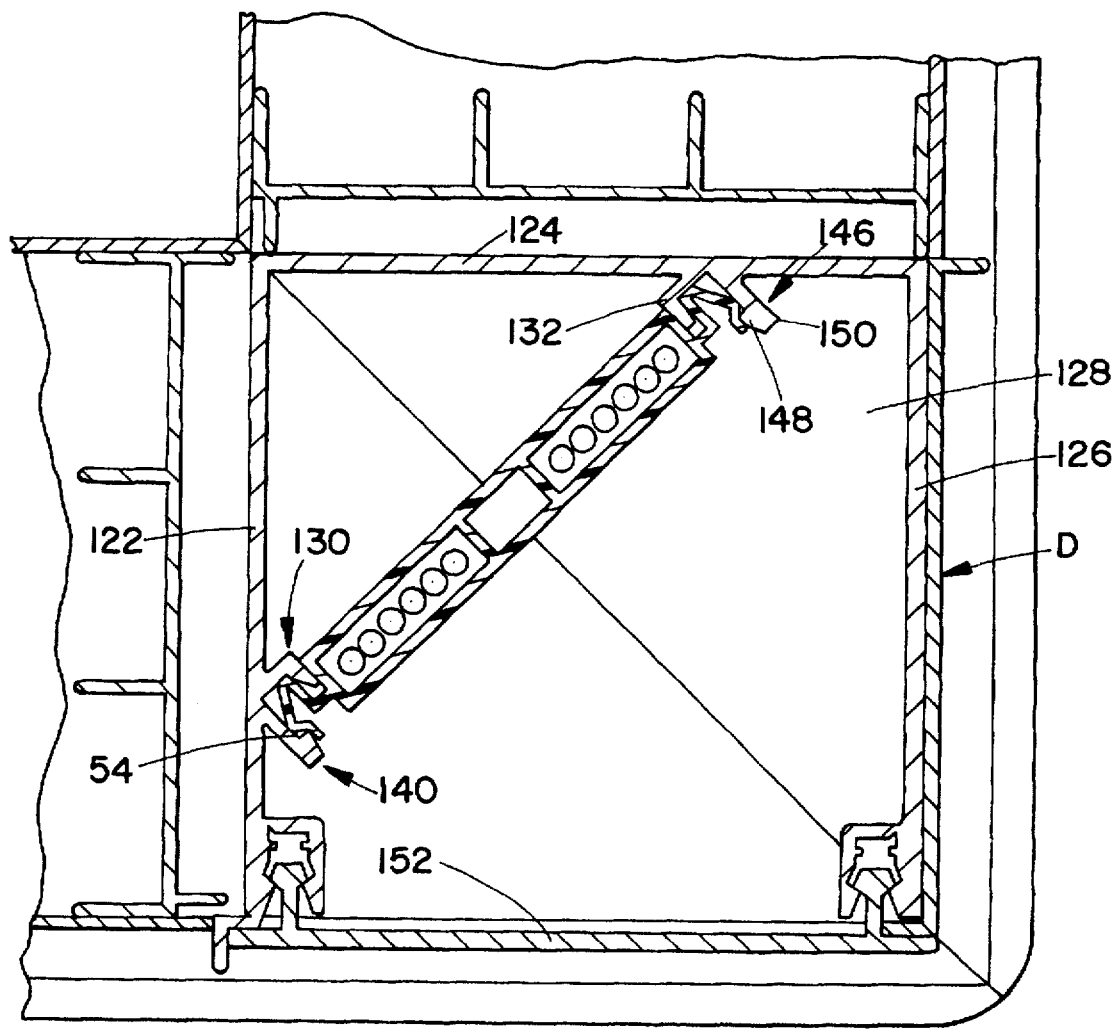
FIG. 8 is a top plan view in cross-section of the corner post of FIG. 7 as holding the raceway of FIG. 1.

Referring now to the drawings, wherein the showings are for purposes of illustrating a preferred embodiment of the invention only and not for purposes of limiting same, FIG. 1 shows an electrical raceway A according to the present invention. The raceway can be secured in a variety of hollow structural members B (FIG. 2), C (FIG. 6), and D (FIG. 8). While the raceway is illustrated as being used with these three structural members, it should be appreciated by those of average skill in the art that the raceway could also be secured in a variety of other suitably configured structural members.

With reference now to FIG. 1, the raceway A comprises a tubular body 10 including an elongated first end wall 12 and first and second elongated side walls 14 and 16 which are secured at one end thereof to a respective side of the first end wall. An elongated second end wall 18 is secured at its two sides to an adjacent end of the pair of side walls 14 and 16. A tubular housing is thus formed. Preferably, the tubular housing is approximately rectangular in cross-section as is evident from e.g. FIG. 2. A first barrier wall 24 can extend between the first and second end walls 12, 18 such that the barrier wall is parallel to the first and second side walls 14, 16, and is located therebetween. If desired, a second barrier wall 26 can also extend between the first and second end walls in a spaced manner from the first barrier wall. The first and second barrier walls 24 and 26 can extend between the open ends of the raceway A. With such a construction, a first longitudinally extending channel 28 is defined between the first side wall 14 and the first barrier wall 24, a second longitudinally extending channel 30 is defined between the first and second barrier walls 24 and 26, and a third longitudinally extending channel 32 is defined between the second barrier wall 26 and the second side wall 16.

Projecting away from the first side wall 14 is a first wing 38, and projecting away from the second side wall 16 is a second wing 40. The two wings are mirror images of each other. Therefore, only the first wing 38 will be discussed herein in detail, it being appreciated that the second wing 40 has the identical structure.

Figure 3:
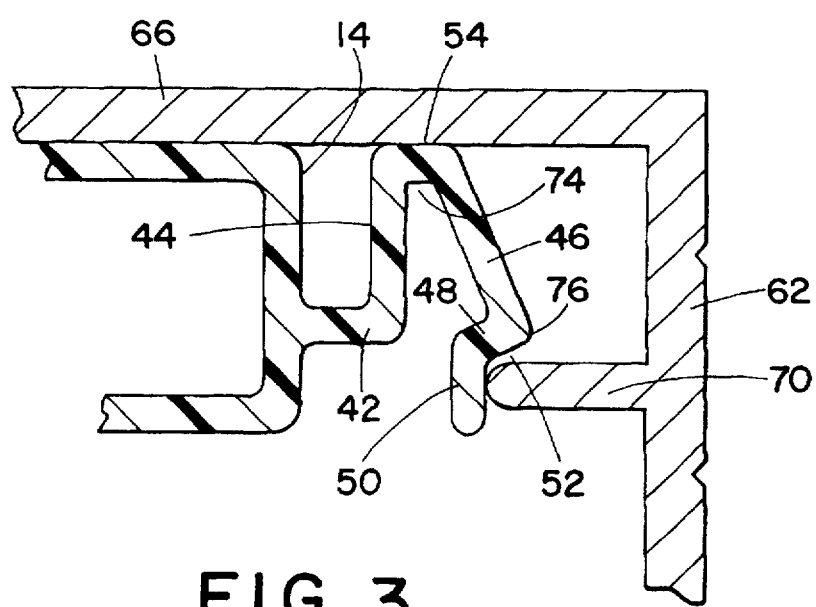
FIG. 3 is an enlarged cross sectional view of a portion of FIG. 2.

With reference now to FIG. 3, the first wing 38 comprises a first section 42 which projects approximately perpendicularly from the first side wall 14. Extending approximately perpendicular to the first section 42 is a second section 44. A third section 46 extends at an acute angle to the second section 44. A short fourth section 48 extends approximately perpendicular to the third section 46. Finally, a fifth section 50 extends at an acute angle to the fourth section. Defined between the second and third section 44, 46 is an abutment surface 52. Serving as a shoulder 54 is an outer surface of the fourth section 48.

With reference again now to FIG. 2, one or more conventional wires can extend through the first and third channels 28, 32 defined in the raceway tubular body 10. Generally, no wires extend through the second channel 30. The wires can be electrical wires, phone cables, speaker wire, or cable t.v. wires. It is contemplated that electrical wiring 56 would be run through one of the channels 28, 32 while phone, speaker and/or cable wires 58 would be run through the other one. The purpose for the second channel 30 is merely to isolate the fasteners (not illustrated) which run through the raceway A in order to secure the master frame of a door (not illustrated) into the structural member B. In this way, the metallic fasteners are separated completely from the first and third channels 28 and 32 through which wiring is run.

The raceway body 10 can be made of a suitable, conventional thermoplastic material such as polyvinylchloride. In this way, the raceway not only houses the electrical wiring and shields the wiring from the surrounding structural members B, C, or D. These can, if desired, be made of a conventional metal such as extruded aluminum.

Figure 2:
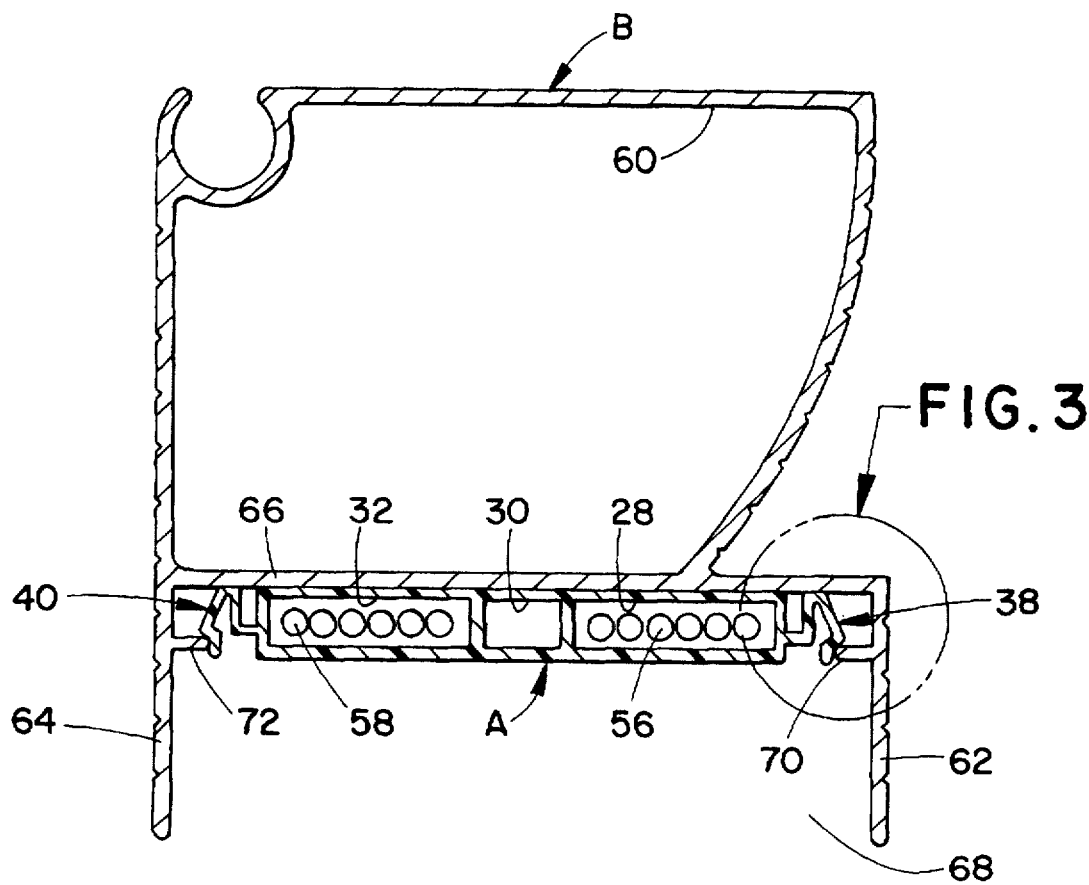
FIG. 2 is a top plan view in cross-section of the raceway of FIG. 1 as held in a header support assembly according to the present invention.

Illustrated in FIG. 2 is the second structural member B. This can be a header support assembly 60 employed for supporting roof panels of a sunroom or the like which are added to a building. The header support assembly 60 comprises spaced first and second side walls 62 and 64 which are connected by an end wall 66. Projecting into a trough 68 defined between the side walls and end wall are respective first and second fingers 70, 72. It should be appreciated that FIG. 2 is a cross-sectional view. Therefore, the side walls 62, 64, end wall 66 and fingers 70, 72 extend along the length of the header support assembly 60 from one end thereof to the other end thereof.

Figure 4A:
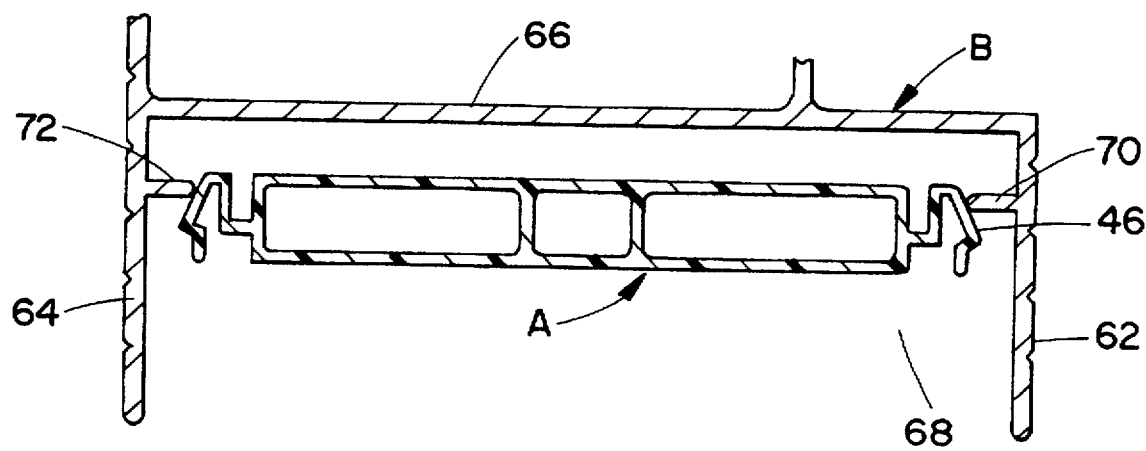
FIGS. 4A–4C illustrate the process for securing the raceway of FIG. 1 in the header support assembly of FIG. 2.
Figure 4B:
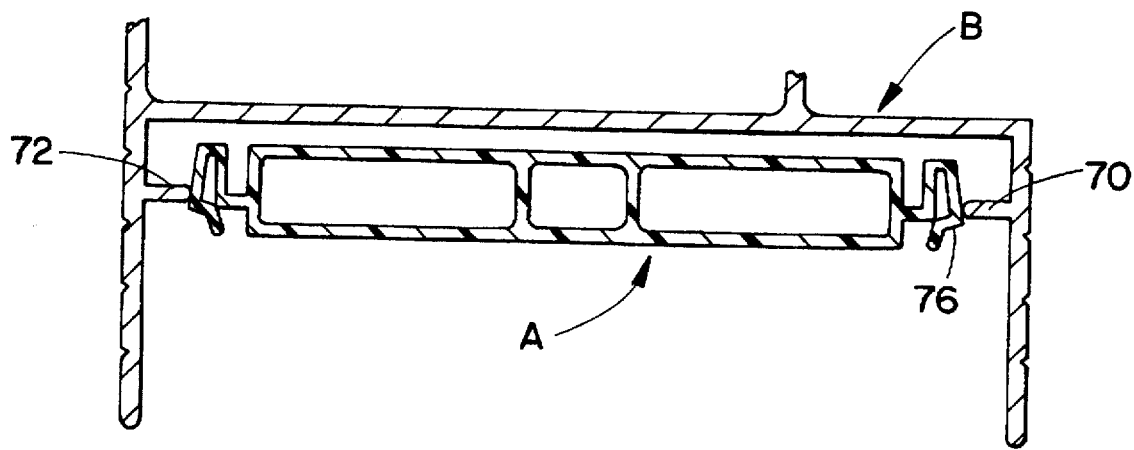
Figure 4C:
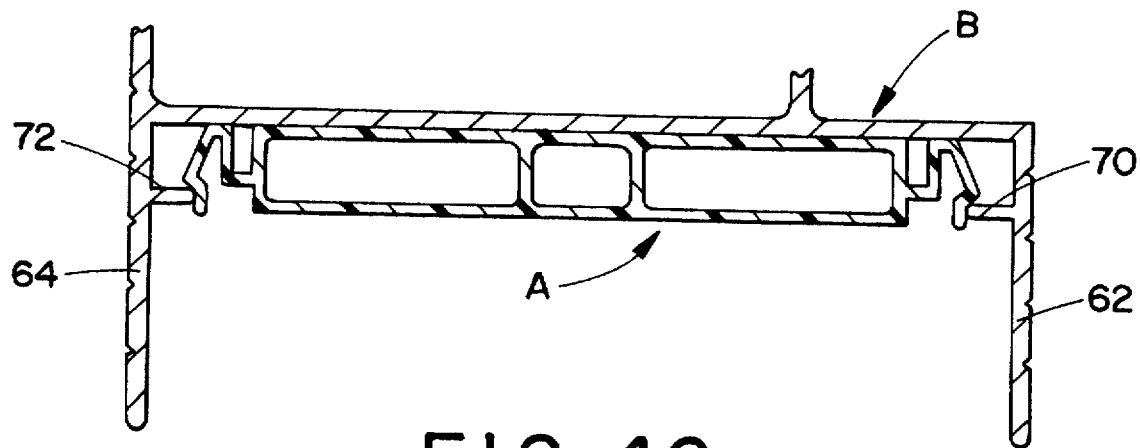

With reference now to FIGS. 4A–4C, the method of securing the raceway A to the structural member is there illustrated. The raceway is inserted in the trough 68, which is defined between the first and second side walls 62, 64. As the raceway A is brought closer to the end wall 66, the third sections 46 of the respective wings 38, 40 will contact the tips of the opposed fingers 70, 72 (see FIG. 4A). Further movement of the raceway towards the end wall 66 will result in a flexure of the outer portion of the wings inwardly towards the respective side walls 14, 16 of the tubular body 10 about respective pivot points 74 (FIG. 3) defined between the second and third sections 44, 46 (see FIG. 4B). As illustrated in FIG. 4B, the wings will then assume a configuration in which the fourth sections 48 will approximately parallel the third sections 46. Once the outermost tips 76 (FIG. 3) of the wings 38, 40 clear the first and second fingers 70, 72, the wings will snap outwardly as is illustrated in FIG. 4C due to the resilient nature of the material from which the raceway A is made. At this point, the abutment surfaces 52 of the wings will contact the end wall 66 while the shoulders 54 of the wings will be located adjacent the fingers 70, 72 to hold the tubular body in place.

Figure 6:
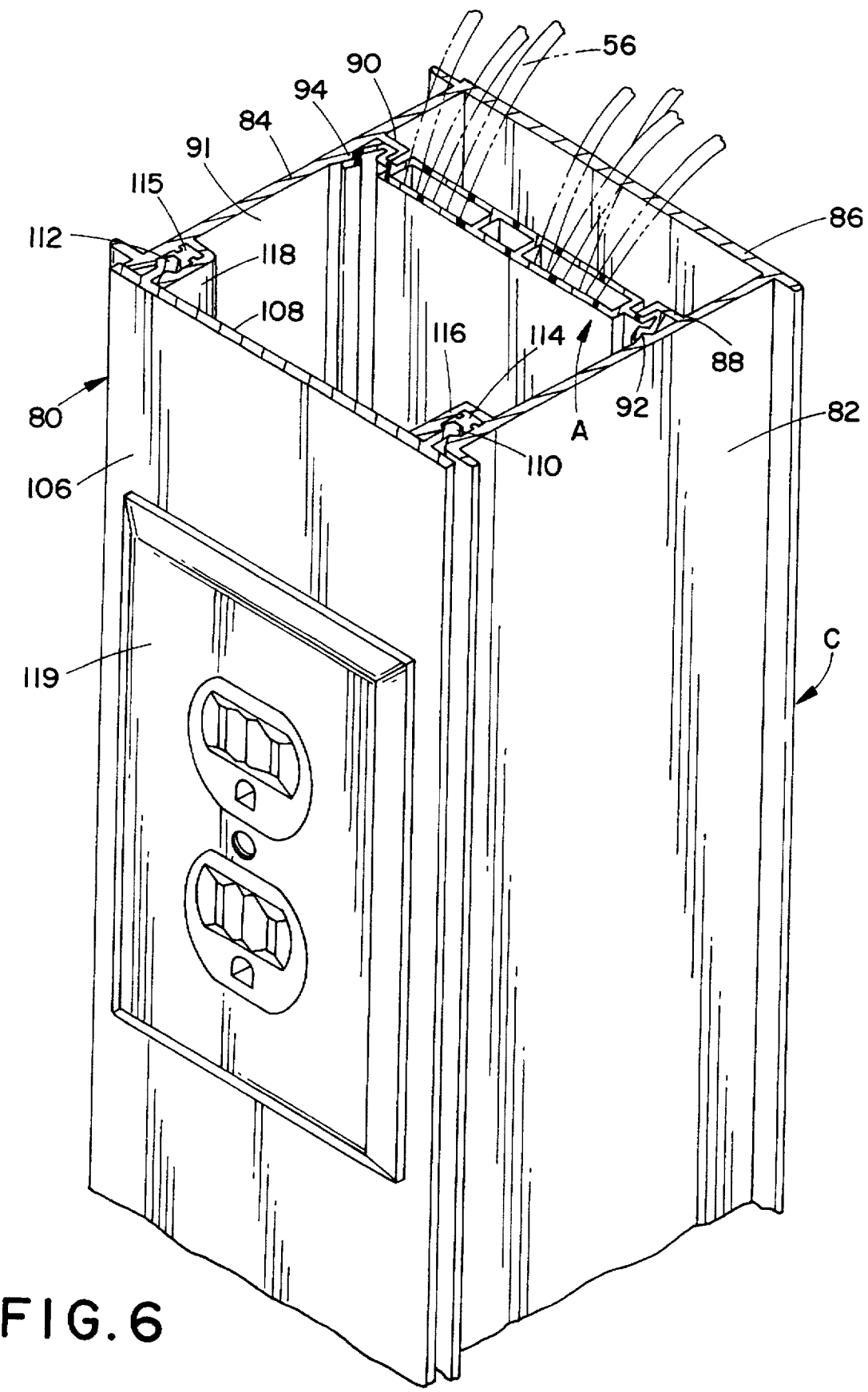
FIG. 6 is a perspective view of the wall post of FIG. 5 with one end in cross section illustrating a raceway held in the wall post.
Figure 7:
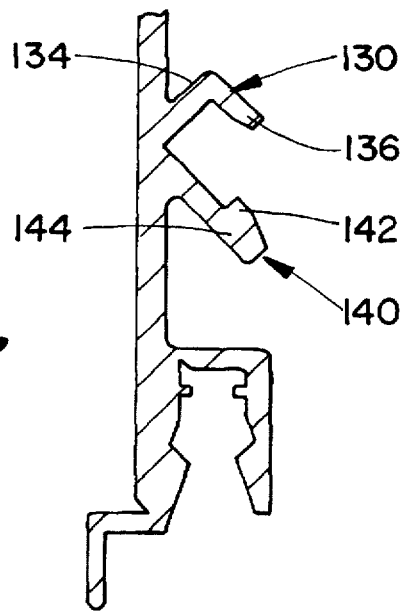
FIG. 7 is an enlarged cross-sectional view of a portion of a corner post according to the present invention.

With reference now to FIG. 6, another structural member C in which the raceway A can be secured comprises a wall post 80 including first and second side walls 82 and 84 and an end wall 86. Protruding from each of the side walls are respective first and second L-shaped arms 88, 90 which extend towards each other and into a trough 91 which is defined between the side walls 82, 84 and the end wall 86. As is evident from FIG. 6, the tubular body 10 can be secured in the trough 91 such that the respective wings 38, 40 are seated in a respective L-shaped arm 88, 90. When this occurs, the shoulder 54 of each wing will be located adjacent a respective protrusion 92, 94 in order to keep the tubular body secured in the channel.

Figure 5:
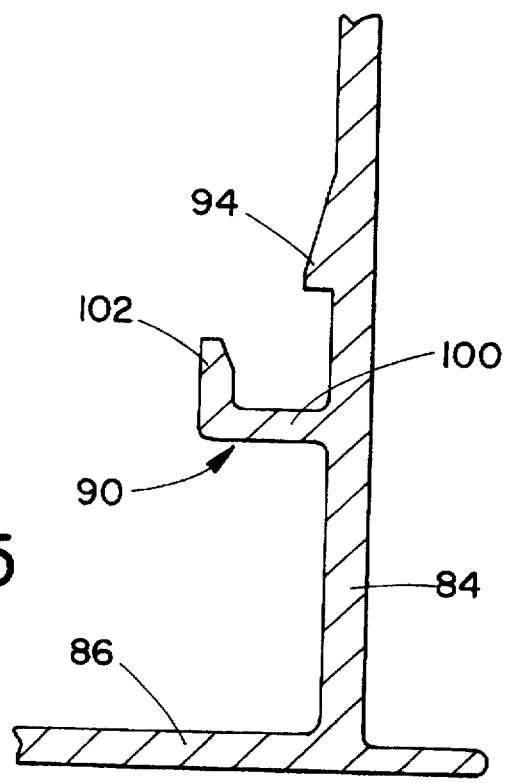
FIG. 5 is an enlarged cross-sectional view through a portion of a wall post according to the present invention.

With reference now to FIG. 5, each L-shaped arm 88, 90 has a first section 100 and a second section 102 which extends perpendicular to the first section. Abutment surface 55 contacts the arm first section 100. There is a gutter formed between a respective side wall 14, 16 and the second section 44 of the wing. The projecting second arm section 102 is seated in this gutter as is evident from FIG. 6.

A snap cover 106 can be secured in place to fully enclose the trough 91 of the wall post 80. The snap cover includes an inner surface 108 on which there are provided spaced first and second locking rails 110, 112. The two rails are located adjacent the opposite side edges of the cover. The rails are seated in respective troughs 114, 115 defined adjacent the first and second side walls 82, 84 of the wall post 80. The troughs 114, 115 are formed by respective L-shaped legs 116, 118 which are preferably of one piece with the side walls 82, 84. As mentioned, the wall post can be formed of an extruded aluminum material for this purpose.

It is evident from FIG. 6 that a conventional electrical outlet 119 is secured to the snap cover 106. One or more of the electrical wires 56 which extend through the raceway A can be secured to the outlet 119 as is well known. To this end, the raceway A does not extend along the entire length of the wall post 80. Rather, the raceway terminates adjacent the electrical outlet 119 in order to allow the wiring 56 to be connected to the outlet. If needed, another portion of the raceway A can be provided on the other side of the outlet 119 to lead the electrical wiring to, e.g., another outlet.

With reference now to FIG. 8, the third structural member D can comprise a corner post 120 having a first wall 122, a second wall 124, and a third wall 126. Extending into a trough 128 defined between the three walls is a first L-shaped arm 130 and a second L-shaped arm 132. These arms extend, respectively, from the first and second walls 122, 124 at an acute angle to the walls. As with the L-shaped arms in the second structural member C, the L-shaped arms 130, 132 each include a first section 134 and a second section 136 which extends perpendicular to the first section.

Also extending inwardly from the first wall 122 into the channel 128 in a spaced manner from the first L-shaped arm 130 is a first finger 140. The finger extends at an acute angle to the wall 122 such that it parallels the second section 136 of the L-shaped arm 130. A protrusion 142 is located on a free end 144 of the first finger 140. Extending into the channel 128 from the second wall 124 is a second finger 146. A protrusion 148 is located on a free end 150 of the second finger 146. When the raceway A is secured in place in the channel 128 of the corner post 120, the shoulders 54 of the respective wings 38 contact a is respective protrusion 142, 148 of the first and second fingers 140, 146 in order to hold the tubular body 10 in position.

A snap cover 152 can be secured to the first and third walls 122, 126 in order to fully enclose the channel 128. Therefore, all wiring is totally concealed when the snap covers are in place. The snap covers can be removed without destroying them. When this is done, the raceways can be exposed so that the wiring held in them can be repaired or new wiring can be added. The structural members C, D can be external members. To this end, the snap covers make the structural members C, D weatherproof.

With this system, both the interior and exterior application of electrical fixtures can be done. Moreover, wiring can be run to any location in the sunroom or additional room added on to the building. Also, the sunroom or building addition can be fully constructed and the electrical wiring can be installed at a later point in time. This speeds up the construction process, thus saving the consumer time and money. The raceway A is suspended within the structural member B, C, D so that the structural member acts both as a housing for the raceway and as a structural component of the additional room.

The snap fit of the raceway A in the tubular housings B, C and D allows a placement of the raceway A where it is needed. However, if the raceway is not needed, the structural members B, C and D can be used without the raceway. When, and if, it is necessary to either add a wire or replace a wire being held in the raceway A, the snap covers 106, 152 can be removed so that access to the raceway A can be had.

The invention has been described with reference to a preferred embodiment. Obviously, modifications and alterations will occur to others upon the reading and understanding of the preceding specification. It is intended that the invention be construed as including all such alterations and modifications insofar as they come within the scope of the appended claims or the equivalents thereof.

I claim:

1. An electrical raceway comprising:

a tubular housing having a first end, a second end and a longitudinally extending channel through which an associated electrical conductor is able to extend, said channel extending from said first end toward said second end;

a first wing projecting away from a first wall of said tubular housing;

a second wing projecting away from a second wall of said tubular housing, said first and second wings cooperating with sections of an associated structural member to secure said tubular housing in the structural member; and, wherein said first wing comprises:

a first section projecting approximately perpendicular to said first wall;

a second section extending approximately perpendicular to said first section; and, a third section extending at an acute angle to said second section.

2. The raceway of claim 1 wherein said first wing further comprises a shoulder defined at a free end of said third section.

3. The raceway of claim 1 wherein said first wing further comprises;

a fourth section extending approximately perpendicular to said third section; and, a fifth section extending at an acute angle to said fourth section.

4. The raceway of claim 1 wherein said tubular housing comprises an approximately rectangular body such that said first and second walls are opposed side walls and further including:

a top wall connected at its respective ends to an adjacent portion of said first and second side walls; and, a bottom wall connected at its respective ends to an adjacent portion of said first and second side walls.

5. The raceway of claim 4 further comprising a barrier wall extending into said channel from at least one of said top and bottom walls parallel to said first and second side walls and located therebetween, said barrier wall dividing said channel into a first section and a second section.

6. A structural member for a building, comprising:

a one piece elongated support member having a pair of legs defining a trough therebetween and a projection extending into said trough from each of said legs; and, an electrical raceway removably secured to said support member, said raceway comprising:

a tubular housing having a first end and a second end and a channel extending longitudinally through said housing from said first end toward said second end, said channel being adapted to accommodate an associated electrical conductor, a first wing projecting away from a first side of said tubular housing, and a second wing projecting away from a second side of said tubular housing, said first and second wings cooperating with said projections of said support member to secure said tubular housing in said support member, and wherein said first wing and said second wing are resilient spring clips which clip into the projections of the elongated support member.

7. The structural member of claim 6 wherein said first wing comprises:

a first section projecting approximately perpendicular to a wall defining said first side;

a second section extending approximately perpendicular to said first section; and, a third section extending at an acute angle to said second section.

8. The structural member of claim 7 wherein said first wing further comprises a shoulder defined at a free end of said third section.

9. The structural member of claim 7 wherein said first wing further comprises;

a fourth section extending approximately perpendicular to said third section; and, a fifth section extending at an acute angle to said fourth section.

10. The structural member of claim 6 wherein said tubular housing comprises:

a first side wall;

a second side wall spaced from said first side wall;

a top wall connected at its respective ends to an adjacent portion of said first and second side walls; and, a bottom wall connected at its respective ends to an adjacent portion of said first and second side walls.

11. The structural member of claim 10 further comprising a barrier wall extending into said channel from at least one of said top and bottom walls parallel to said first and second side walls and located therebetween, said barrier wall dividing said channel into a first section and a second section.

12. The structural member of claim 6 wherein said projection extending from each leg into said channel comprises a finger.

13. The structural member of claim 6 wherein said projection extending from each leg into said channel comprises an L-shaped arm.

14. The structural member of claim 6 wherein said raceway is positioned within said trough defined in said elongated support member and further comprising a cover arranged to close said trough to fully shield said raceway.

15. The structural member of claim 14 further comprising a means for selectively mounting said cover on said support member.

16. A structural member for a building, comprising:

a one piece elongated support member having a pair of legs defining a trough therebetween and a projection extending into said trough from each of said legs; and, an electrical raceway removably secured in said support member, said raceway comprising:

a tubular housing having a first end and a second end and a channel extending longitudinally through said housing from said first end toward said second end, said channel being adapted to accommodate an associated electrical conductor, a first wing projecting away from a first side of said tubular housing, a second wing projecting away from a second side of said tubular housing, said first and second wings cooperating with said projections of said support member to secure said tubular housing in said support member, wherein said projection extending from each leg into said channel comprises an L-shaped arm, and wherein said legs each further comprise a protrusion spaced from said L-shaped arm, each said protrusion cooperating with a portion of a respective said wing.

17. The structural member of claim 16 wherein said protrusion is located on a finger extending away from said leg in spaced relation to said L-shaped arm.

18. A structural member for a building, comprising:

a one piece elongated support member having a pair of legs defining a trough therebetween and a projection extending into said trough from each of said legs; and, a one piece elongated electrical raceway removably secured in said support member, said raceway comprising:

a tubular housing having a pair of opposed side walls and a pair of opposed end walls to define a channel extending between opposed open ends of said housing such that an associated electrical conductor is able to extend longitudinally through said housing, a first wing projecting away from a first side wall of said tubular housing, a second wing projecting away from a second side wall of said tubular housing, said first and second wings are flexible and snapped into a cooperating relationship with said projections of said support member to selectively secure said tubular housing in said support, and wherein said projection extending from each leg into said trough comprises an L-shaped arm including a base section and a projecting section and wherein said each of said wings includes portions for accommodating said projecting section of each L-shaped arm.

19. The structural member of claim 18 wherein said projection extending from each leg into said trough comprises a finger and wherein said first and second wings each include shoulders that seat on said fingers.

20. The structural member of claim 18 wherein said legs each further comprise a protrusion spaced from said L-shaped arm, each said protrusion cooperating with a free end of a respective said wing.

21. The structural member of claim 20 wherein said protrusion is located on a finger extending away from said leg in spaced relation to said L-shaped arm.

22. A structural member for a building, comprising:

a one piece elongated support member for supporting structural panels of the building, the support member including three walls defining a trough therebetween and a trough opening, an exterior of at least two of the three walls of the support member adapted to support one of said structural panels;

a one piece elongated electrical raceway including a tubular housing having a channel extending between opposed open ends of said housing to receive an electrical conductor and at least one attachment wing for removably securing the electrical raceway in the support member such that the entire electrical raceway is contained within the trough; and a snap cover removably secured to the support member and covering the trough opening such that the snap cover is removable to access the electrical raceway when the support member and the structural panels are assembled.

23. The structural member of claim 22 wherein the snap cover includes two rails located along opposite side edges of the cover which snap into respective grooves of the support member.

24. The structural member of claim 23 wherein the grooves are formed of one piece with two of the three walls of the support member.

\* \* \* \* \*